US012716480B2

(12) United States Patent
Wanaka et al.

(10) Patent No.: US 12,716,480 B2
(45) Date of Patent: Aug. 25, 2026

(54) SPEED REDUCER AND INDUSTRIAL MACHINE

(71) Applicant: NABTESCO CORPORATION, Tokyo (JP)

(72) Inventors: Yuta Wanaka, Tokyo (JP); Shuichi Kamagata, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 19/039,075

(22) Filed: Jan. 28, 2025

(65) Prior Publication Data

US 2025/0251038 A1 Aug. 7, 2025

(30) Foreign Application Priority Data

Feb. 2, 2024 (JP) ................................ 2024-015033

(51) Int. Cl.
*F16H 57/029* (2012.01)
*F16H 57/08* (2006.01)
(Continued)

(52) U.S. Cl.
CPC .......... *F16H 57/029* (2013.01); *F16H 57/08* (2013.01); *E02F 9/123* (2013.01); *E02F 9/202* (2013.01);
(Continued)

(58) Field of Classification Search
CPC .... F16H 57/029; F16H 1/32–2001/328; B60K 17/046
See application file for complete search history.

(56) References Cited

U.S. PATENT DOCUMENTS 6,679,801 B2 * 1/2004 Nohara .................... F16H 1/32 184/6.12
7,604,559 B2 * 10/2009 Fujimoto ................. F16H 1/32 475/170
(Continued)

FOREIGN PATENT DOCUMENTS

CA 2953484 A1 1/2016
CA 2953484 C 10/2018
(Continued)

OTHER PUBLICATIONS

Office Action dated Jan. 9, 2026, issued in German Patent Application No. 102025103632.2, with English machine translation (4 pgs.).
(Continued)

*Primary Examiner* — Sherry L Estremsky
(74) *Attorney, Agent, or Firm* — Pillsbury Winthrop Shaw Pittman, LLP

(57) ABSTRACT

The present invention makes it possible to inhibit the enlargement of a lubrication region in a speed reducer including a sealing member. The speed reducer includes a case, a carrier, main bearings, and a sealing member. The carrier is located at least partly inside the case. The main bearings are located between the case and the carrier. The sealing member includes a first ring, a second ring, and a first elastic ring. The first ring is annular and mounted to one of the case and the carrier. The second ring contacts an annular region of the first ring. The first elastic ring is compressed between the second ring and the other of the case and carrier. The sealing member is located at least partly in the same region as the main bearings in the radial direction perpendicular to the rotation axis of the carrier rotating relative to the case.

9 Claims, 7 Drawing Sheets

(51) Int. Cl.

| | |
|---|---|
| *E02F 9/12* | (2006.01) |
| *E02F 9/20* | (2006.01) |
| *F16H 1/32* | (2006.01) |
| *F16H 57/02* | (2012.01) |

(52) U.S. Cl.

CPC ...... *F16H 1/32* (2013.01); *F16H 2057/02056* (2013.01); *F16H 2057/02073* (2013.01)

(56) References Cited

U.S. PATENT DOCUMENTS

| | | | | |
|---|---|---|---|---|
| 7,811,193 | B2 * | 10/2010 | Nakamura | F16H 1/46 475/179 |
| 7,935,017 | B2 * | 5/2011 | Kurita | F16H 1/32 475/176 |
| 8,323,143 | B2 * | 12/2012 | Schoon | B60K 17/046 475/330 |
| 8,360,534 | B2 * | 1/2013 | Vom Stein | F16J 15/344 305/106 |
| 10,099,550 | B2 | 10/2018 | Naitou | |
| 2006/0040779 | A1 * | 2/2006 | Tsurumi | F16H 1/32 475/183 |
| 2013/0307320 | A1 * | 11/2013 | Akamatsu | B60L 7/14 301/6.5 |
| 2017/0129331 | A1 | 5/2017 | Naitou | |

FOREIGN PATENT DOCUMENTS

| | | | | | |
|---|---|---|---|---|---|
| CN | 1980828 | A | * | 6/2007 | B62D 55/0887 |
| CN | 111237433 | A | | 6/2020 | |
| CN | 111425566 | A | * | 7/2020 | F16H 57/028 |
| CN | 112762174 | A | * | 5/2021 | F16J 15/06 |
| CN | 112833101 | A | * | 5/2021 | F16C 33/7823 |
| CN | 112833145 | A | * | 5/2021 | F16H 57/023 |
| EP | 4303465 | A1 | * | 1/2024 | B60K 7/0007 |
| JP | H1193961 | A | * | 4/1999 | F16C 33/7813 |
| JP | 2006183871 | A | * | 7/2006 | |
| JP | 2009085267 | A | * | 4/2009 | |
| JP | 6453880 | B2 | | 1/2019 | |
| WO | WO-2016084595 | A1 | * | 6/2016 | F16J 15/3284 |
| WO | WO-2018164151 | A1 | * | 9/2018 | B60K 7/00 |

OTHER PUBLICATIONS

Office Action dated Aug. 29, 2025, issued in German Patent Application No. 102025103632.2, with English machine translation (8 pgs.).

* cited by examiner

SPEED REDUCER AND INDUSTRIAL MACHINE

CROSS-REFERENCE TO RELATED APPLICATIONS

This application is based on and claims the benefit of priority from Japanese Patent Application Serial No. 2024-015033 (filed on Feb. 2, 2024), the contents of which are hereby incorporated by reference in their entirety.

TECHNICAL FIELD

The present invention relates to a speed reducer and an industrial machine.

BACKGROUND

Industrial machines including a speed reducer are known as disclosed in, for example, Japanese Patent No. 6453880 ("the '880 Patent"). Industrial machines are used outdoors. A speed reducer includes a case, a bearing located in the case, and a carrier arranged to be rotatable relative to the case via the bearing. In a speed reducer, a lubrication region is formed to store oil for lubricating the bearing and the carrier.

The speed reducer disclosed in the '880 Patent includes a sealing member for sealing the lubrication region. The sealing member includes a floating seal. Locating the sealing member away from the carrier and the bearing enlarges the lubrication region and increases oil storage in the speed reducer. Increased oil storage results in an increased amount of oil used in the speed reducer and an increased weight of the speed reducer. An object of the present invention is to inhibit the enlargement of the lubrication region in a speed reducer including a sealing member.

SUMMARY

A speed reducer according to one embodiment of the invention includes:

- a case;
- a carrier at least partly located in the case;
- a main bearing located between the case and the carrier; and
- a sealing member including:
  - a first ring having an annular shape and mounted to one of the case and the carrier;
  - a second ring in contact with an annular region of the first ring; and
  - an elastic ring compressed between the second ring and another of the case and the carrier,
- wherein the sealing member is at least partly located in a same region as the main bearing in a radial direction perpendicular to the rotation axes of the carrier and the case.

An industrial machine according to one embodiment of the invention includes:

- a drive device including a speed reducer,
- wherein the speed reducer includes:
  - a case;
  - a carrier at least partly located in the case;
  - a main bearing located between the case and the carrier; and
  - a sealing member that provides sealing between the case and the carrier,
- wherein the sealing member includes:
  - a first ring having an annular shape and mounted to one of the case and the carrier;
  - a second ring in contact with an annular region of the first ring; and
  - an elastic ring compressed between the second ring and another of the case and the carrier, and
- wherein the sealing member is at least partly located in a same region as the main bearing in a radial direction perpendicular to rotation axes of the carrier and the case.

Advantageous Effects

The present invention makes it possible to inhibit the enlargement of the lubrication region in a speed reducer including a sealing member.

DESCRIPTION OF THE PREFERRED EMBODIMENTS

Figure 1:
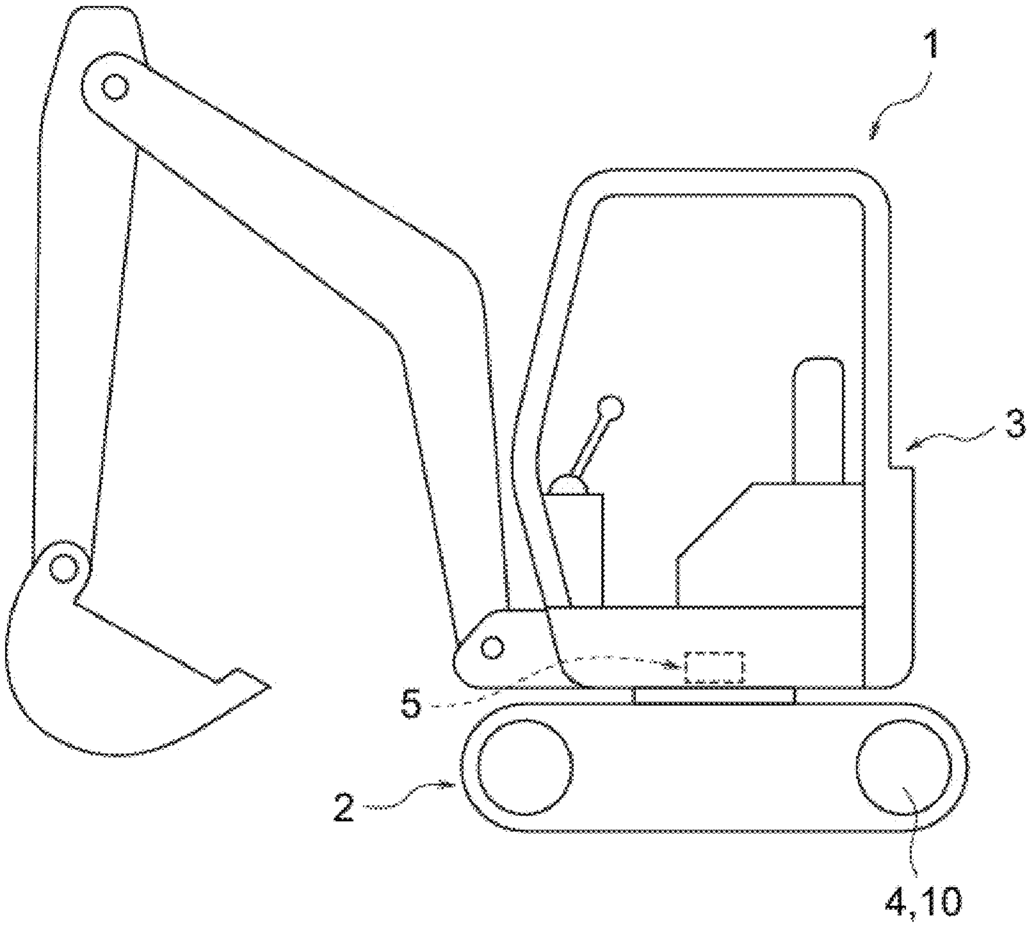
FIG. 1 is a side view of an industrial machine for describing an embodiment of the invention.

An embodiment of the invention relates to the following items <1> to <9>.

<1> A speed reducer comprising:

- a case;
- a carrier at least partly located in the case;
- a main bearing located between the case and the carrier; and
- a sealing member including:
  - a first ring having an annular shape and mounted to one of the case and the carrier;
  - a second ring in contact with an annular region of the first ring; and
  - an elastic ring compressed between the second ring and another of the case and the carrier,
- wherein the sealing member is at least partly located in a same region as the main bearing in a radial direction perpendicular to the rotation axes of the carrier and the case.

<2> The speed reducer of item <1>, wherein the first ring has a thickness for pressing the second ring toward the elastic ring at the annular region.

<3> The speed reducer of item <1> or <2>, wherein a contact surface in which the second ring and the first ring contact each other is located in the case.

<4> The speed reducer of any one of items <1> to <3>, wherein the first ring is located between the second ring and the main bearing in an axial direction parallel to the rotation axis, and wherein the first ring includes a portion that is at least partly located in a same region as the main bearing in the axial direction.

<5> The speed reducer of any one of items <1> to <4>, wherein the first ring includes a first portion and a second portion connected to the first portion in the axial direction, wherein the first portion is located in a same region as the main bearing in the axial direction, wherein the second portion includes a portion located on an inner side of the first portion in the radial direction, and wherein the first ring is in contact with the second ring at the second portion.

<6> The speed reducer of item <5>, wherein a length of the first portion in the radial direction is smaller at a connection portion with the second portion.

<7> The speed reducer of item <5> or <6>, wherein the first ring includes an elastic portion, the elastic portion being located between the first portion and the second portion and made of a material having a smaller Young's modulus than materials of the first portion and the second portion.

<8> The speed reducer of any one of items <1> to <7>, wherein the carrier is at least partly located in the case so as to have a gap between the carrier and the case on a radially outer side of a contact surface in which the second ring and the first ring contact each other, and wherein the gap includes a portion extending in the radial direction and a portion extending in an axial direction parallel to the rotation axis.

<9> An industrial machine comprising:

a drive device including a speed reducer, wherein the speed reducer includes:

a case;

a carrier at least partly located in the case;

a main bearing located between the case and the carrier; and a sealing member that provides sealing between the case and the carrier, wherein the sealing member includes:

a first ring having an annular shape and mounted to one of the case and the carrier;

a second ring in contact with an annular region of the first ring; and an elastic ring compressed between the second ring and another of the case and the carrier, and wherein the sealing member is at least partly located in a same region as the main bearing in a radial direction perpendicular to rotation axes of the carrier and the case.

One embodiment of the present invention will be hereinafter described with reference to the attached drawings. In the drawings, for ease of illustration and understanding, a scale size, a dimensional ratio, and so on are altered as appropriate for exaggeration from actual values. The features and components shown in one or more of the drawings may not be shown in other drawings.

Terms such as "parallel," "orthogonal," "identical," and so on, to specify shape and geometric conditions and their degrees, are not limited to their strict senses. These terms are to be interpreted to include the extent to which similar functions can be expected.

FIGS. 1 to 5 are provided for describing one embodiment of the present invention. FIG. 1 is a side view of an industrial machine 1. The industrial machine 1 shown is a construction machine. A construction machine is used outdoors for construction work. The construction machine shown is an excavator. Unlike the illustrated example, the industrial machine 1 may be a dump truck.

The industrial machine 1 shown in FIG. 1 includes an undercarriage 2 and a slewable upper structure 3 mounted on the undercarriage 2 so as to be slewable relative to the undercarriage 2. The undercarriage 2 is a device for traveling of the industrial machine 1. The undercarriage 2 includes a drive device 4 that provides the driving force for traveling of the industrial machine 1. The drive device 4 shown provides the driving force by a rotational motion around a rotation axis extending orthogonally to the drawing. The slewable upper structure 3 includes a slewing device 5. The slewing device 5 provides the slewing force by a rotational motion around a rotation axis extending in the vertical direction in the drawing.

The drive device 4 shown in FIG. 1 includes a speed reducer 10. The speed reducer 10 reduces the rotational motion from the input shaft and outputs the reduced rotational motion. The drive device 4 may include a motor for rotating the input shaft. The reduced rotational motion is output from the output shaft of the speed reducer 10. In the industrial machine 1 shown in FIG. 1, the speed reducer 10 is applied to the drive device 4. The speed reducer 10 may be applied to the slewing device 5. The speed reducer 10 applied to the drive device 4 is hereinafter described with reference to FIGS. 2 to 4.

Figure 2:
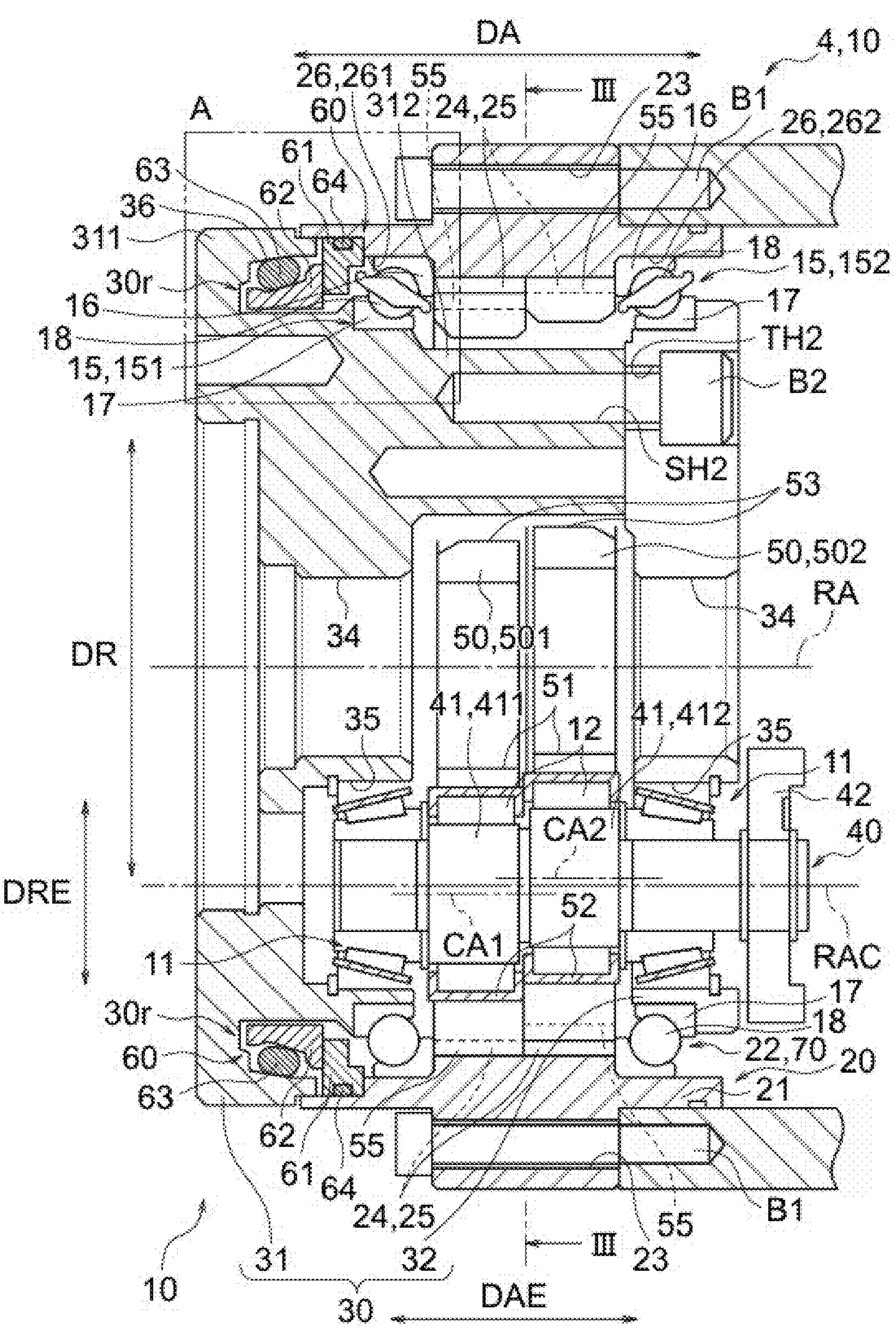
FIG. 2 is a sectional view of a speed reducer included in the industrial machine shown in FIG. 1.
Figure 3:
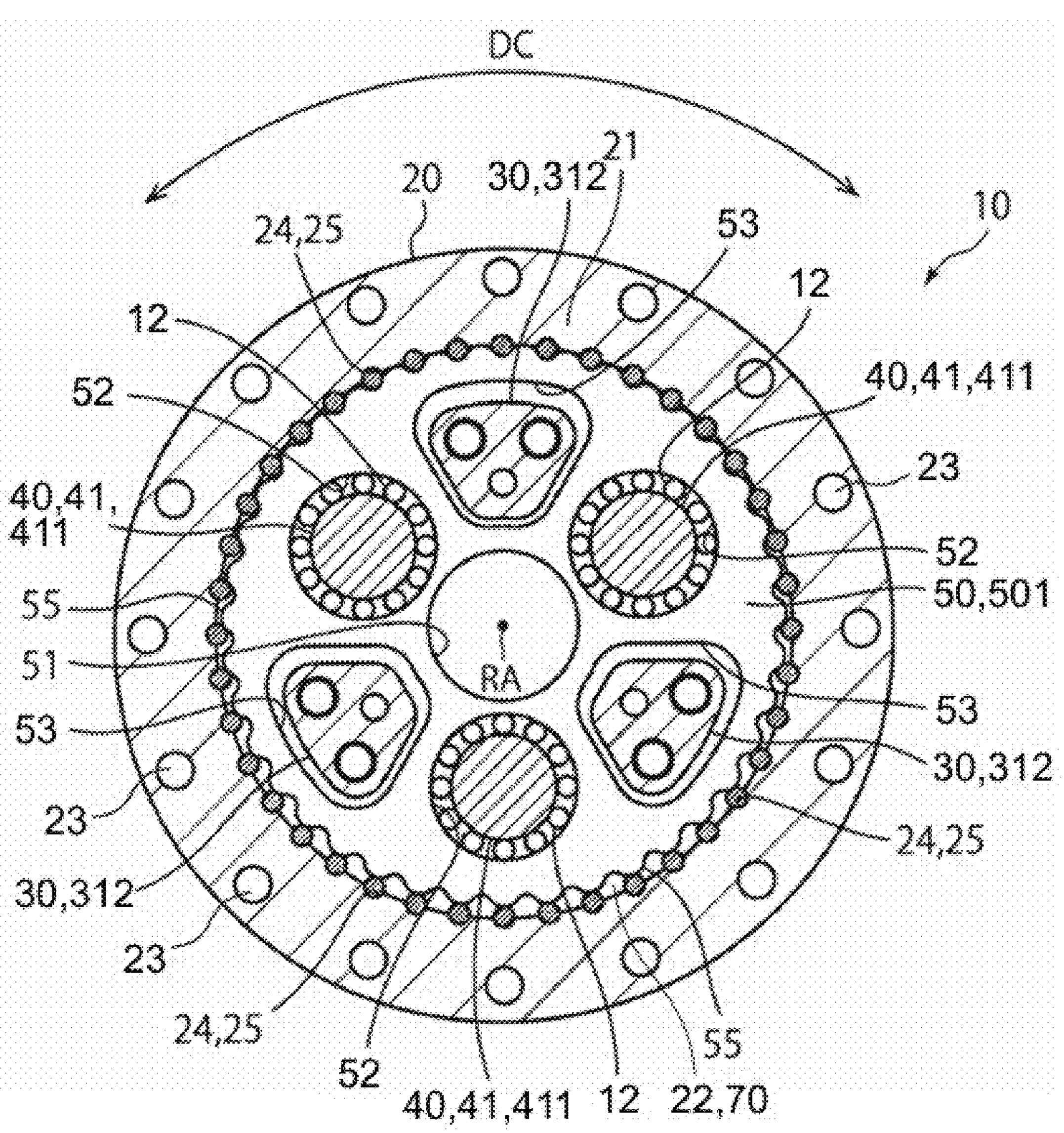
FIG. 3 is a sectional view taken along the line III-III in FIG. 2.

The speed reducer 10 shown in FIGS. 2 and 3 is an eccentric oscillating speed reducer, as described below. Other than the illustrated example, the speed reducer 10 may also be a planetary gear speed reducer. The speed reducer 10 shown includes a case 20, a carrier 30, main bearings 15, and a sealing member 60. The carrier 30 is disposed at least partly inside the case 20. The carrier 30 can rotate around the rotation axis RA relative to the case 20 via the main bearings 15. The main bearings 15 shown are located between the case 20 and the carrier 30 in the radial direction DR orthogonal to the rotation axis RA. The sealing member 60 seals between the case 20 and the carrier 30. The sealing member 60 shown is disposed at least partly inside the case 20.

The speed reducer 10 shown in FIGS. 2 and 3 includes crankshafts 40 and external gears 50. Each of the crankshafts 40 is supported by the carrier 30 so as to be rotatable around the rotation axis RAC relative to the carrier 30. Each of the external gears 50 is driven by the rotation of the crankshaft 40 relative to the carrier 30. The carrier 30 rotates around the rotation axis RA relative to the case 20 by the external gear 50 being driven. In the speed reducer 10 shown, the rotation of the carrier 30 relative to the case 20 is output as the rotational motion. Thus, the carrier 30 shown serves as the output shaft of the speed reducer 10. Instead of the carrier 30, the case 20 may serve as the output shaft of the speed reducer 10.

The case 20 shown in FIGS. 2 and 3 includes a case body 21. The case body 21 has a first hole 22 that penetrates the case body 21 in the axial direction DA. The first hole 22 shown forms a space for at least partly housing the main bearings 15, the carrier 30, the crankshafts 40, the external gears 50, and the sealing member 60.

As shown in FIGS. 2 and 3, the case body 21 may have a plurality of second holes 23 arranged in the circumferential direction DC. The circumferential direction DC extends around the rotation axis RA. Each of the second holes 23 penetrates the case body 21 in the axial direction DA. In the drive device 4 shown, the second holes 23 of the case 20 may be penetrated by bolts B1 for fixing the speed reducer 10 to another component of the drive device 4. The other component of the drive device 4 may be a housing for housing the motor.

The case 20 shown in FIGS. 2 and 3 includes a plurality of internal tooth pins 24 retained on the inner surface of the case body 21. The inner surface of the case body 21 has pin grooves formed therein that are arranged along the circumferential direction DC. The pin grooves extend in the axial direction DA, which is parallel to the rotation axis RA. The internal tooth pins 24 are received in the pin grooves. The internal tooth pins 24, which are received in the pin grooves, can rotate relative to the case body 21 around a rotation axis extending in the axial direction DA. The plurality of internal tooth pins 24 shown in FIG. 3 form internal teeth 25 of the case 20.

Figure 4:
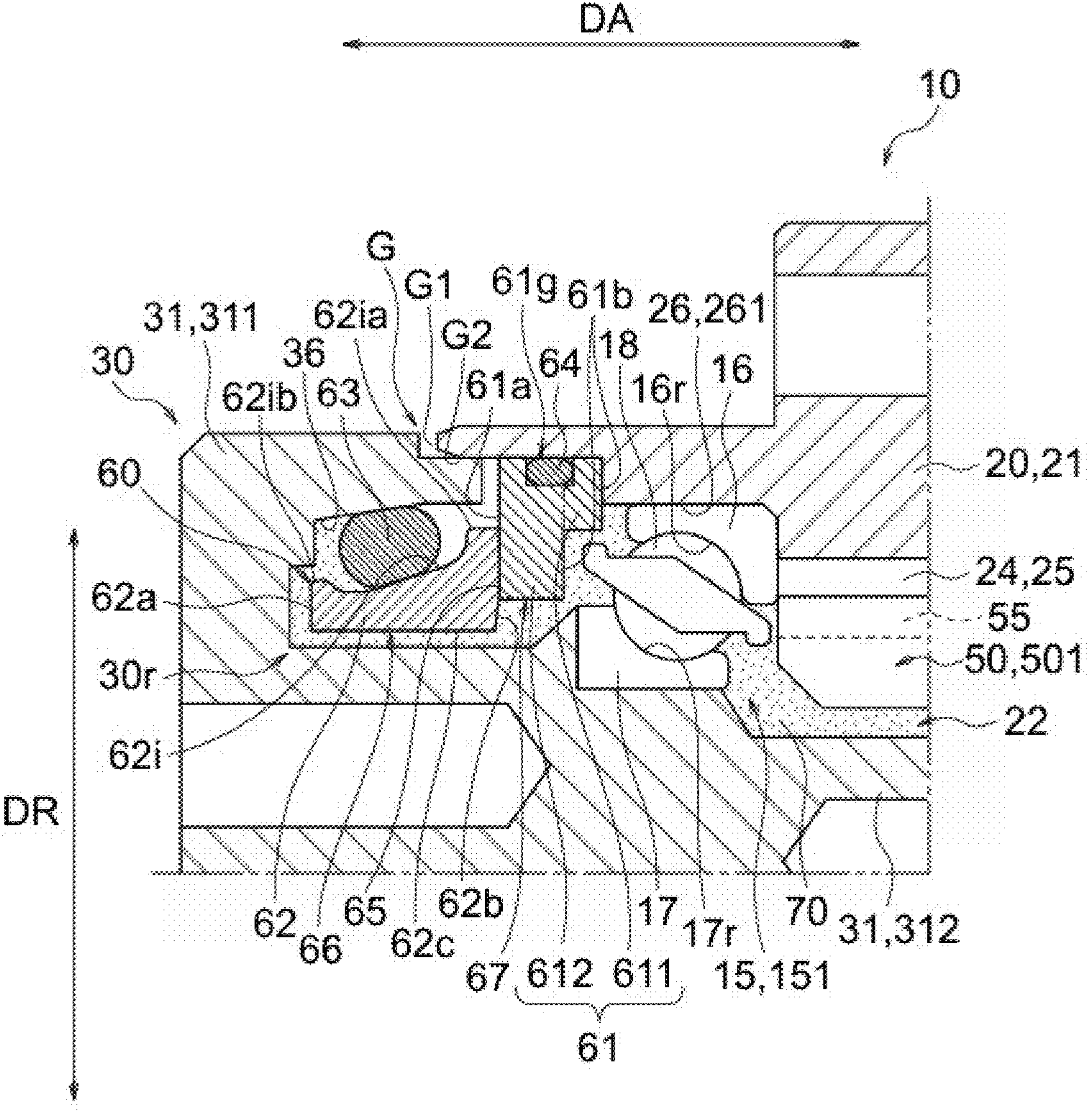
FIG. 4 is an enlarged view of the part A of FIG. 2, or a sectional view of a sealing member.

The inner circumferential surface of the case 20 (case body 21) shown in FIGS. 2 and 4 includes a contact surface 26 contacted by the main bearings 15. The contact surface 26 shown extends in the axial direction DA along the circumferential direction DC. The contact surface 26 of the case 20 shown includes a first contact surface 261 contacted by the first main bearing 151 and a second contact surface 262 contacted by the second main bearing 152. The first and second main bearings 151 and 152 will be described later.

The carrier 30 shown in FIGS. 2 and 3 is disposed at least partly in the first hole 22. The rotation axis RA of the carrier 30 is located in the first hole 22. The carrier 30 shown includes a portion having a diameter smaller than the diameter of the first hole 22, that is, the inner diameter of the case body 21. The carrier 30 shown also includes a portion having a diameter larger than the diameter of the first hole 22.

The carrier 30 shown in FIG. 2 includes a carrier base portion 31 and a plate portion 32 adjacent to the carrier base portion 31 in the axial direction DA. The carrier base portion 31 and the plate portion 32 shown are restricted from moving relative to each other by bolts B2. The rotation axis of the bolts B2 shown is parallel to the axial direction DA.

As shown in FIG. 4, the carrier 30 may be disposed at least partly inside the case 20 so as to have a gap G between the carrier 30 and the case 20. In FIG. 4, the gap G between the case 20 and the carrier 30 is open outward in the radial direction DR, that is, away from the rotation axis RA in the radial direction DR. The gap G includes a first portion G1 and a second portion G2 connected to the first portion G1. The first portion G1 and the second portion G2 extend in directions that are not parallel to each other. The first portion G1 shown extends in the radial direction DR. The second portion G2 shown extends in the axial direction DA. The gap G is located on the outer side of a contact region 65 of a first ring 61 in the radial direction DR, which is described later.

The carrier base portion 31 shown in FIGS. 2 and 3 includes a base plate portion 311 shaped like a disk and columnar portions 312 protruding in the axial direction DA from the base plate portion 311. The base plate portion 311 and the columnar portions 312 shown are integrated with each other. As shown in FIG. 3, a plurality of columnar portions 312 protrude from the base plate portion 311. FIG. 3 shows three columnar portions 312 arranged at equal intervals in the circumferential direction DC. Each columnar portion 312 has a screw hole SH2 that engages with the bolt B2. The screw hole SH2 shown in FIG. 2 is open in the axial direction DA toward the plate portion 32.

As shown in FIGS. 2 and 4, the carrier 30 may have a recess 30r for at least partly receiving the sealing member 60. The recess 30r shown is formed in the base plate portion 311 of the carrier base portion 31. The recess 30r is open in the axial direction DA toward the first hole 22 of the case 20. In the carrier base portion 31 shown, the recess 30r is located on the outer side of the columnar portions 312 in the radial direction DR. The recess 30r extends in the circumferential direction DC. In the base plate portion 311 shown, the portion where the recess 30r is formed is concave in the direction opposite to the direction in which the columnar portions 312 protrude in the axial direction DA. As shown in FIGS. 2 and 4, the recess 30r may include a portion at least partly located within the first hole 22 when the carrier 30 is at least partly located within the case 20.

The plate portion 32 shown in FIG. 2 has through holes TH2 penetrated by the bolts B2. The through holes TH2 are aligned with the screw holes SH2 in the axial direction DA. The through holes TH2 may each have an enlarged diameter to receive the head of bolt B2, as shown in FIG. 2.

The carrier 30 shown in FIG. 2 has a central hole 34 that penetrates the carrier 30 in the axial direction DA. The central hole 34 shown penetrates the carrier base portion 31 and the plate portion 32. In the carrier 30 shown, the rotation axis RA is located in the central hole 34.

The carrier 30 shown in FIG. 2 has a plurality of through holes 35 that penetrates the carrier 30 in the axial direction DA. The carrier 30 shown has three through holes 35 arranged at equal intervals in the circumferential direction DC. The through holes 35 each penetrate the carrier base portion 31 and the plate portion 32. The central hole 34 and the through holes 35 shown are connected to each other at the end of the carrier 30 that is away from the case 20 in the axial direction DA.

Each of the through holes 35 shown in FIG. 2 receives first bearings 11. The through hole 35 shown receives two first bearings 11 that are spaced apart from each other in the axial direction DA. The crankshaft 40, which is held in the carrier 30 via the first bearings 11, can rotate around the rotation axis RAC relative to the carrier 30. The rotation axis RAC of the crankshaft 40 is parallel to the axial direction DA. The first bearings 11 may be tapered roller bearings, as shown in FIG. 2.

In the carrier 30 shown in FIGS. 2 and 4, the recess 30r includes a contact surface 36 that contacts a first elastic ring 63 (described later) of the sealing member 60. The contact surface 36 extends in the axial direction DA along the circumferential direction DC. As shown in FIG. 4, the contact surface 36 may include a portion located on the inner side of the contact surface 26 between the case 20 and the main bearing 15 in the radial direction DR. Unlike FIG. 4, the contact surface 36 may include a portion located on the outer side of the contact surface 26 in the radial direction DR.

The contact surface 36 may be inclined with respect to the axial direction DA, as shown in FIG. 4. In the contact surface 36 shown in FIG. 4, the distance of the inclined contact surface 36 from the rotation axis RA decreases toward the direction away from the case 20 in the axial direction DA. In the contact surface 36 shown, the portion farthest from the case 20 in the axial direction DA is located on the inner side of the contact surface 26 between the case 20 and the main bearing 15 in the radial direction DR.

The carrier 30 shown in FIGS. 2 and 3 can rotate around the rotation axis RA relative to the case 20 via the main bearings 15. The speed reducer 10 shown includes two main bearings 15 spaced apart from each other in the axial direction DA. The speed reducer 10 shown includes a first main bearing 151 and a second main bearing 152 as the two main bearings 15. The first and second main bearings 151 and 152 are located in the first hole 22 of the case 20. The first main bearing 151 is located between the case 20 (case body 21) and the carrier base portion 31 in the radial direction DR. The second main bearing 152 is located between the case 20 (case body 21) and the plate portion 32 in the radial direction DR.

Each of the two main bearings 15 shown in FIG. 2 includes an outer ring 16, an inner ring 17, and a plurality of rolling elements 18 disposed between the outer ring 16 and inner ring 17. The inner ring 17 is located on the inner side of the outer ring 16 in the radial direction DR, that is, closer to the rotation axis RA in the radial direction DR than the outer ring 16. The outer ring 16 and the inner ring 17 extend in the circumferential direction DC. The outer ring 16 is mounted to the case 20. The inner ring 17 is mounted to the carrier 30. The plurality of rolling elements 18 are spaced in the circumferential direction DC. The main bearings 15 shown are rolling bearings. The rolling elements 18 shown are balls. Thus, the main bearings 15 shown are ball bearings. In the main bearings 15, the inner ring 17 and the rolling elements 18 are movable in the circumferential direction DC relative to the outer ring 16. The main bearings 15 may include a cage (not shown) to maintain spacing between adjacent rolling elements 18 in the circumferential direction DC.

In the first and second main bearings 151 and 152 shown in FIGS. 2 and 4, the outer ring 16 is mounted to the case 20. The outer ring 16 is in contact with the inner circumferential surface (contact surface 26) of the case body 21 from the inside in the radial direction DR. The outer ring 16 mounted to the case 20 is restricted from moving relative to the case 20. As shown in FIG. 4, the outer ring 16 includes a curved surface 16*r* facing inward in the radial direction DR. The outer ring 16 shown is in contact with the rolling elements 18 at the curved surface 16*r*.

In the first main bearing 151 shown in FIGS. 2 and 4, the inner ring 17 is mounted to the carrier base portion 31 of the carrier 30. The inner ring 17 is in contact with the outer circumferential surface of the carrier base portion 31 from the outside in the radial direction DR. In the first main bearing 151, the inner ring 17 mounted to the carrier base portion 31 is restricted from moving relative to the carrier base portion 31 of the carrier 30.

In the second main bearing 152 shown in FIGS. 2, the inner ring 17 is mounted to the plate portion 32 of the carrier 30. The inner ring 17 is in contact with the outer circumferential surface of the plate portion 32 from the outside in the radial direction DR. In the second main bearing 152, the inner ring 17 mounted to the plate portion 32 is restricted from moving relative to the plate portion 32 of the carrier 30.

As shown in FIG. 4, the inner ring 17 includes a curved surface 17*r* facing outward in the radial direction DR. The inner ring 17 shown is in contact with the rolling elements 18 at the curved surface 17*r*.

The crankshaft 40 shown in FIG. 2 includes two eccentric members 41 arranged in the axial direction DA. Each of the eccentric members 41 has a cylindrical shape with an axial direction DAE parallel to the axial direction DA. FIG. 2 shows a first eccentric member 411 and a second eccentric member 412 as the two eccentric members 41. The center axis CA1 of the first eccentric member 411 and the center axis CA2 of the second eccentric member 412 are offset relative to the rotation axis RAC of the crankshaft 40 in the radial direction DRE perpendicular to the axial direction DAE. The center axis CA1 of the first eccentric member 411 is offset relative to the rotation axis RAC of the crankshaft 40 in the direction away from the rotation axis RA in the radial direction DRE. The center axis CA2 of the second eccentric member 412 is offset relative to the rotation axis RAC of the crankshaft 40 in the direction toward the rotation axis RA in the radial direction DRE. The amount of offset of the center axis CA1 relative to the rotation axis RAC may be the same as the amount of offset of the center axis CA2 relative to the rotation axis RAC.

The crankshaft 40 shown in FIG. 2 includes an input gear 42 located at the end in axial direction DA. The input gear 42 meshes with an input shaft (not shown) located in the central hole 34. The input shaft may rotate around a rotation axis parallel to the axial direction DA. The rotation of the input shaft is transmitted to the crankshaft 40 through the meshing between the input shaft and the input gear 42.

The two external gears 50 shown in FIGS. 2 and 3 are housed in the case 20. The external gears 50 are located between the base plate portion 311 and the plate portion 32 in the axial direction DA. Each of the external gears 50 is driven by the rotation of the crankshaft 40 relative to the carrier 30. The speed reducer 10 shown includes two external gears 50 arranged in the axial direction DA. FIG. 2 shows a first external gear 501 and a second external gear 502 as the two external gears 50 arranged in the axial direction DA. Of the two external gears 50, the first external gear 501 is located on the base plate portion 311 side in the axial direction DA. Of the two external gears 50, the second external gear 502 is located on the plate portion 32 side in the axial direction DA. FIG. 3 shows the first external gear 501 of the two external gears 50.

Each of the external gears 50 shown in FIG. 2 has a central hole 51 located at the center thereof. The external gear 50 has external teeth 55 arranged along the outer edge thereof centered on the central hole 51. The number of external teeth 55 is smaller than the number of internal teeth 25, that is, the number of internal tooth pins 24. By way of an example, the number of external teeth 55 is smaller by one than the number of internal teeth 25. The outer diameter of the external gear 50 shown is smaller than the inner diameter of the case 20 at the area where the internal tooth pins 24 are located.

The external gear 50 shown in FIGS. 2 and 3 has a plurality of eccentric member insertion holes 52 equally spaced in the circumferential direction around the central hole 51. FIG. 3 shows three eccentric member insertion holes 52 arranged in the circumferential direction. Each of the eccentric member insertion holes 52 receives a second bearing 12. The crankshaft 40 is held via the second bearing 12 so as to be rotatable relative to the external gear 50. In particular, in the crankshaft 40 shown in FIGS. 2 and 3, the eccentric members 41 are held via the second bearings 12 so as to be rotatable relative to the external gears 50.

The external gear 50 shown in FIGS. 2 and 3 has a plurality of columnar portion insertion holes 53 equally spaced in the circumferential direction around the central hole 51. FIG. 3 shows three columnar portion insertion holes 53 arranged in the circumferential direction. In the external gear 50 shown in FIG. 3, the eccentric member insertion holes 52 and the columnar portion insertion holes 53 are arranged alternately in the circumferential direction. In FIGS. 2 and 3, each of the columnar portion insertion holes 53 is penetrated by the columnar portion 312 of the carrier base portion 31.

The external gear 50 shown in FIGS. 2 and 3 has external teeth 55 on the outer circumferential surface thereof. The outer circumferential surface of the external gear 50 including the external teeth 55 contacts the plurality of internal pins 24 of the case 20. The external gear 50, driven by the crankshaft 40, moves relative to the case 20, while contacting the internal tooth pins 24 at the external teeth 55. As described later, the center axis of the external gear 50 moving relative to the case 20 revolves around the rotation axis RA. The movement of the external gear 50 relative to the case 20 is transmitted to the carrier 30, and thus the carrier 30 rotates around the rotation axis RA relative to the case 20.

The speed reducer 10 shown in FIGS. 2 to 4 includes oil for lubricating the components that move relative to the case 20. In the speed reducer 10 shown, the components that move relative to the case 20 include the carrier 30, the main bearings 15, the crankshafts 40, and the external gears 50. The speed reducer 10 has a lubrication region 70 that stores oil. The lubrication region 70 shown contains the main bearings 15 and the external gears 50. The lubrication region 70 shown contains, at least partly, the carrier 30 and the crankshafts 40. The oil stored in the lubrication region 70 lubricates the carrier 30, the main bearings 15, the crankshafts 40, and the external gears 50. In other words, the oil inhibits wear and heat generation in these components caused by the movement relative to the case 20. The lubrication region 70 shown in FIG. 4 contains the portion of the case 20 located in the first hole 22 and the portion of the carrier 30 located in the recess 30*r*. FIG. 2 does not show the oil.

The sealing member 60 shown in FIGS. 2 and 4 seals the lubrication region 70. The sealing member 60 shown seals between the case 20 and the carrier 30. The sealing member 60 inhibits the oil from flowing out of the lubrication region 70. The sealing member 60 inhibits foreign matter such as dust, sand, and dirty water from entering the lubrication region 70 and contaminating the oil. The sealing member 60 inhibits poor lubrication in the speed reducer 10 due to contaminated oil.

The sealing member 60 shown in FIGS. 2 and 4 includes a first ring 61, a second ring 62, and a first elastic ring 63. The sealing member 60 may include a second elastic ring 64, as shown in FIGS. 2 and 4. The first ring 61 is in contact with the second ring 62 in a contact region 65 having an annular shape. The contact region 65 having an annular shape extends in the circumferential direction DC. In the sealing member 60 shown, the first ring 61 and the second elastic ring 64 are located in the first hole 22. In the sealing member 60 shown, the second ring 62 and the first elastic ring 63 are located in the recess 30*r* of the carrier 30.

In the sealing member 60 shown in FIG. 4, the second ring 62 and the first elastic ring 63 constitute a floating seal 66. In the sealing member 60 shown, the first ring 61 and the second elastic ring 64 constitute a mating ring 67.

The first ring 61 shown in FIGS. 2 and 4 has an annular shape. The first ring 61 having an annular shape is mounted to the case 20. The first ring 61 may be mounted to the case 20 by loose fitting. The first ring 61 mounted to the case 20 includes a portion that is in contact with the case 20. The first ring 61 shown is in contact with the inner circumferential surface of the case body 21, that is, the surface facing inward in the radial direction DR, from the inside in the radial direction DR. The first ring 61 mounted to the case 20 has a certain amount of thickness in the axial direction DA. The first ring 61 shown is located between the first main bearing 151 and the second ring 62 in the axial direction DA. The first ring 61 may be made of metal such as chrome molybdenum steel or high-chromium steel. The first ring 61 shown includes a first portion 611 and a second portion 612, both made of metal.

The first ring 61 shown in FIGS. 2 and 4 includes a portion located in the same region as the main bearings 15 in the radial direction DR. Specifically, the first ring 61 includes a portion located in the same region as each of the first and second main bearings 151 and 152 in the radial direction DR. The "portion located in the same region as the main bearings 15 in the radial direction DR" of a component of the sealing member 60 refers to the portion located between the portion of the main bearings 15 closest to the rotation axis RA and the portion of the main bearings 15 farthest from the rotation axis RA in the radial direction DR.

The first ring 61 shown in FIG. 4 includes a first surface 61*a* and a second surface 61*b* spaced apart from each other in the axial direction DA. The first surface 61*a* faces in the axial direction DA. The first ring 61 is in contact with the second ring 62 at the first surface 61*a*. The first ring 61 faces the first main bearing 151 in the axial direction DA at the second surface 61*b*.

The first ring 61 shown in FIG. 4 includes a first portion 611 and a second portion 612 connected to the first portion 611 from the second ring 62 side in the axial direction DA. In the first ring 61 shown, the first portion 611 and the second portion 612 are connected seamlessly. In the first ring 61 shown, the first surface 61*a* is formed by the second portion 612. The second surface 61*b* includes a portion formed by the first portion 611 and a portion formed by the second portion 612. The first portion 611 shown includes a portion located in the same region in the axial direction DA as the first main bearing 151. Specifically, the first portion 611 is located in the same region in the axial direction DA as the inner ring 17 of the first main bearing 151. In other words, the first portion 611 faces the inner ring 17 in the radial direction DR.

In the first ring 61 shown in FIG. 4, the length of the second portion 612 of the first ring 61 in the radial direction DR is larger than the length of the first portion 611 of the first ring 61 in the radial direction DR. The second portion 612 shown includes a portion that is on the inner side of the first portion 611 in the radial direction DR, that is, closer to the rotation axis RA in the radial direction DR. The first ring 61 is in contact with the second ring 62 at a portion of the second portion 612 that is located on the inner side of the first portion 611 in the radial direction DR.

As shown in FIG. 4, the first ring 61 may have a groove 61*g* for receiving the second elastic ring 64. The groove 61*g* shown is formed in the outer circumferential surface of the first ring 61, that is, the surface facing outward in the radial direction DR. The outer circumferential surface of the first ring 61 is concave inward in the radial direction DR at the groove 61*g*. The amount of concavity of the outer circumferential surface in the groove 61*g* may be smaller than the wire diameter of the second elastic ring 64.

The first ring 61 shown in FIG. 4 is connected to the lubrication region 70 at the second surface 61*b* and the inner circumferential surface. In other words, the first ring 61 can contact the oil stored in the lubrication region 70 at the second surface 61*b* and the inner circumferential surface. The inner circumferential surface of the first ring 61 is the surface of the first ring 61 facing inward in the radial direction DR.

In the first ring 61 shown in FIGS. 2 and 4, the first surface 61*a* forms the contact region 65 having an annular shape. The contact region 65 may be referred to as the contact surface. The contact region 65 shown is located in the same region in the radial direction DR as the first main bearing 151 and the second main bearing 152. The contact region 65 shown in FIG. 4 is located in the same region in the radial direction DR as the rolling elements 18 of the first main bearing 151.

The second ring 62 shown in FIG. 4 includes a first surface 62*a* and a second surface 62*b* spaced apart from each other in the axial direction DA. The first and second surfaces 62*a* and 62*b* face in the axial direction DA. The second ring 62 is in contact with the first ring 61 at the second surface 62*b*. The second ring 62 may be made of metal such as chrome molybdenum steel.

The second ring 62 shown in FIG. 4 has a third surface 62*c* connecting the first surface 62*a* and the second surface 62*b*. With the second ring 62 located in the recess 30*r*, the third surface 62*c* extends in the axial direction DA along the circumferential direction DC. The third surface 62*c* shown is spaced apart from the wall of the recess 30*r* in the radial direction DR.

The second ring 62 shown in FIGS. 2 and 4 includes an inclined portion 62*i* inclined with respect to the axial direction DA. The inclined portion 62*i* is located at the outer circumferential surface of the second ring 62. The length in the radial direction DR of the second ring 62, including the inclined portion 62*i*, increases toward the case 20 (first hole 22) along the axial direction DA. As shown in FIG. 4, the ends 62*ia* and 62*ib* of the inclined portion 62*i* in the axial direction DA may protrude outward in the radial direction DR. Of the ends 62*ia* and 62*ib* shown, the first end 62*ia* is located closer to the first ring 61 in the axial direction DA than is the second end 62*ib*.

The second ring 62 shown in FIGS. 2 and 4 is located in the same region as the first and second main bearings 151 and 152 in the radial direction DR. The second ring 62 shown is located in the same region as the rolling elements 18 of the main bearings 15 in the radial direction DR. The second ring 62 shown does not include a portion located on the outer side of the main bearings 15 in the radial direction DR.

The second ring 62 shown in FIG. 4 is connected to the lubrication region 70 at the first surface 62*a*, the second surface 62*b*, the third surface 62*c*, and a part of the inclined portion 62*i*. The inclined portion 62*i* is connected to the lubrication region 70 at the region including the second end 62*ib*.

The first elastic ring 63 shown in FIGS. 2 and 4 has an annular shape. The first elastic ring 63 having an annular shape extends in the circumferential direction DC. The first elastic ring 63 shown is located in the recess 30*r* of the carrier 30. The first elastic ring 63 is in contact with the carrier base portion 31 (base plate portion 311) of the carrier 30 from the inside in the radial direction DR. The first elastic ring 63 is in contact with the second ring 62 from the outside in the radial direction DR.

When the sealing member 60 seals between the case 20 and the carrier 30, the first elastic ring 63 is compressed between the carrier 30 and the second ring 62, as shown in FIG. 4. The first elastic ring 63 being compressed is in contact with the inclined portion 62 of the second ring 62, thereby pressing the second ring 62 toward the first ring 61 in the axial direction DA.

The first elastic ring 63 shown in FIG. 4 is located between the two ends 62*ia* and 62*ib* of the inclined portion 62*i* in the axial direction DA. In the sealing member 60 shown, since the first elastic ring 63 is located between the protruding ends 62*ia* and 62*ib*, the first elastic ring 63 is restricted from moving in the axial direction DA relative to the second ring 62.

The first elastic ring 63 may contain an elastically deformable material. By way of an example, the first elastic ring 63 may contain rubber. The first elastic ring 63 may be referred to simply as the "elastic ring."

The second elastic ring 64 shown in FIGS. 2 and 4 is located in the groove 61*g* formed in the outer circumferential surface of the first ring 61. The second elastic ring 64 located in the groove 61*g* is restricted from moving in the axial direction DA and the radial direction DR relative to the first ring 61. The second elastic ring 64 is located between the first ring 61 and the case 20 (case body 21) in the radial direction DR. The second elastic ring 64 may seal between the case 20 and the first ring 61 in the radial direction DR. The second elastic ring 64 may inhibit dust and other foreign matter from entering the first hole 22 through a gap between the first ring 61 and the case 20. The second elastic ring 64 may contain an elastically deformable material. By way of an example, the second elastic ring 64 may contain rubber.

The following now describes operation of the speed reducer 10 shown in FIGS. 2 and 3.

A torque from the input shaft (not shown) is transmitted to the input gear 42 of the crankshaft 40. The crankshaft 40 rotates around the rotation axis RAC relative to the case 20 and the carrier 30 by the torque transmitted from the input gear 42. In the crankshaft 40 rotating around the rotation axis RAC, the eccentric members 41 rotate eccentrically relative to the case 20 and the carrier 30. Of the two eccentric members 41 shown in FIG. 2, the first eccentric member 411 rotates with the center axis CA1 thereof being offset in the radial direction DRE relative to the rotation axis RAC. The second eccentric member 412 rotates with the center axis CA2 thereof being offset in the radial direction DRE relative to the rotation axis RAC.

The eccentric rotation of the eccentric members 41 drives the external gears 50. The two external gears 50 shown in FIG. 2 move in the radial direction DR relative to the case 20 while contacting the internal tooth pins 24 of the case 20 at the outer circumferential surface. Each of the internal tooth pins 24, contacted by the external gears 50, rotates relative to the case body 21 around a rotation axis parallel to the axial direction DA. As described above, the number of external teeth 55 is smaller by one than the number of internal tooth pins 24. As a result, when each of the external gears 50 moves relative to the case 20, the center axis of the external gear 50 moves in the circumferential direction DC around the rotation axis RA while being offset in the radial direction DR relative to the rotation axis RA. In other words, the external gear 50 moving relative to the case 20 revolves around the rotation axis RA. The revolution period of the external gear 50, that is, the time taken by the center axis of the external gear 50 to circle the track extending in the circumferential direction DC, is larger than the rotational period of the crankshafts 40 and the eccentric members 41.

The revolving motion of the external gear 50 is transmitted to the carrier 30 that supports the external gear 50. Thus, the carrier 30 rotates around the rotation axis RA relative to the case 20. Since the revolution period of the external gear 50 is larger than the rotational period of the crankshafts 40 and the eccentric members 41, the carrier 30 rotates relative to the case 20 at a rotational speed smaller than that of the input shaft. Thus, in the speed reducer 10 shown, the rotational motion of the carrier 30 relative to the case 20 is output as a rotational motion that is reduced in speed compared to the rotational motion input from the input shaft.

The function of the sealing member 60 in the above-described speed reducer 10 will be described.

In the sealing member 60 shown in FIGS. 2 and 4, the first elastic ring 63 is connected to the lubrication region 70. The first elastic ring 63 is placed in compression between the second ring 62 and the carrier 30 in the radial direction DR. Since the first elastic ring 63 is compressed between the second ring 62 and the carrier 30, the oil is inhibited from flowing out through a gap between the first elastic ring 63 and the second ring 62 and a gap between the first elastic ring 63 and the carrier 30. Similarly, since the first elastic ring 63 is compressed between the second ring 62 and the carrier 30, foreign matter is inhibited from flowing in through a gap between the first elastic ring 63 and the second ring 62 and a gap between the first elastic ring 63 and the carrier 30.

In the sealing member 60 shown in FIGS. 2 and 4, the second ring 62 is connected to the lubrication region 70. The second ring 62 is pressed in the axial direction DA toward the first ring 61 by the first elastic ring 63 compressed between the carrier 30 and the second ring 62. The second ring 62 contacts the annular contact region 65 of the first ring 61. Since the second ring 62 is pressed in the axial direction DA toward the first ring 61 and contacts the first ring 61, it can be prevented that oil flows out and foreign matter flows in through the contact region 65.

In the sealing member 60 shown in FIGS. 2 and 4, the first ring 61 is connected to the lubrication region 70. The first ring 61 is mounted to the case 20. The first ring 61 shown is in contact with the inner circumferential surface of the case 20 (case body 21) from the inside in the radial direction DR. Since the first ring 61 is mounted to the case 20, it can be prevented that the oil flows out through a gap between the first ring 61 and the case 20 and foreign matter flows in through a gap between the first ring 61 and the case 20.

In the sealing member 60 shown in FIGS. 2 and 4, the second elastic ring 64 is located in the groove 61*g* of the first ring 61. The second elastic ring 64 is placed in compression between the first ring 61 and the case 20 in the radial direction DR. Since the second elastic ring 64 is compressed between the first ring 61 and the case 20, the oil is more effectively inhibited from flowing out through a gap between the second elastic ring 64 and the first ring 61 and a gap between the first ring 61 and the case 20. Similarly, since the second elastic ring 64 is compressed between the first ring 61 and the case 20, foreign matter is inhibited from flowing in through a gap between the second elastic ring 64 and the first ring 61 and a gap between the first ring 61 and the case 20.

When the carrier 30 rotates around the rotation axis RA relative to the case 20, the second ring 62 rotates together with the first elastic ring 63 and the carrier 30 relative to the case 20, while maintaining contact with the first ring 61. In other words, in the sealing member 60 shown, the floating seal 66 rotates together with the carrier 30 relative to the case 20, while contacting the mating ring 67 at the annular region. Therefore, the sealing member 60 can inhibit the oil from flowing out through the annular contact region 65 of the first ring 61 and inhibit foreign matter from flowing in through the contact region 65, even when the carrier 30 is rotating relative to the case 20.

When the carrier 30 rotates around the rotation axis RA relative to the case 20, the first elastic ring 63 remains compressed between the second ring 62 and the carrier 30 and rotates together with the carrier 30 and the second ring 62. The first elastic ring 63 inhibits the oil from flowing out through a gap between the first elastic ring 63 and the second ring 62 and a gap between the first elastic ring 63 and the carrier 30, even when the carrier 30 is rotating relative to the case 20. The first elastic ring 63 inhibits foreign matter from flowing in through a gap between the first elastic ring 63 and the second ring 62 and a gap between the first elastic ring 63 and the carrier 30, even when the carrier 30 is rotating relative to the case 20.

When the carrier 30 rotates around the rotation axis RA relative to the case 20, the first ring 61 and the second elastic ring 64 are restricted from moving relative to the case 20. In other words, in the sealing member 60 shown, the mating ring 67 is restricted from moving relative to the case 20.

In speed reducers used outdoors, a sealing member including a floating seal is used to inhibit foreign matter such as dust, sand, and dirty water from entering the lubrication region. A sealing member including a floating seal has high durability against foreign matter, and it can effectively inhibit foreign matter from flowing into the lubrication region and inhibit the oil from flowing out of the lubrication region in speed reducers used outdoors. However, since the sealing member is spaced apart from the components that move relative to the case, such as the carrier and the bearings, the lubrication region, which stores oil, is enlarged in the speed reducers. The enlarged lubrication region results in an increased amount of oil stored in the speed reducer. An increase in stored oil can increase the amount of oil used in the speed reducer and the weight of the speed reducer.

By contrast, in the speed reducer 10 shown in FIGS. 2 and 4, the sealing member 60 is located at least partly in the same region as the main bearings 15 in the radial direction DR perpendicular to the rotation axis RA of the carrier 30 rotating relative to the case 20. In particular, in the sealing member 60 shown, each of the first ring 61, the second ring 62, and the first elastic ring 63 is located at least partly in the same region as the main bearings 15 in the radial direction DR. Furthermore, the second ring 62 and the first elastic ring 63 shown in FIGS. 2 and 4 do not include a portion located on the outer side of the main bearings 15 in the radial direction DR.

According to the arrangement of the sealing member 60 shown in FIGS. 2 and 4, the sealing member 60 is close to the main bearings 15 in the radial direction DR. Since the sealing member 60 and the main bearings 15 are close to each other in the radial direction DR, the speed reducer 10 shown can have the lubrication region 70 inhibited from being enlarged in the radial direction DR between the case 20 and the carrier 30. By inhibiting the enlargement of the lubrication region 70, the oil stored in the speed reducer 10 is reduced, and the weight of the speed reducer 10 can be reduced.

In the sealing member 60 shown in FIG. 4, the contact region 65 of the first ring 61 is located in the first hole 22 formed in the case 20. In other words, the contact region 65 is located in the case 20. Since the contact region 65 is located in the case 20, the lubrication region 70 can be inhibited from being enlarged to the outside of the case 20 in the axial direction DA. Therefore, with the sealing member 60 shown, the enlargement of the lubrication region 70 in the axial direction DA can be inhibited.

In the sealing member 60 shown in FIGS. 2 and 4, the first ring 61 is located between the second ring 62 and the first main bearing 151 in the axial direction DA. The first ring 61 includes a first portion 611 and a second portion 612 connected to the first portion 611. The first portion 611 is located in the same region as the main bearings 15 in the axial direction DA. In other words, the first ring 61 includes a portion that is located in the same region as the main bearings 15 in the axial direction DA. This arrangement of the first ring 61 reduces the protruding length of the sealing member 60 protruding from the main bearings 15 in the axial direction DA. This allows the speed reducer 10 to have the lubrication region 70 inhibited from being enlarged in the axial direction DA between the case 20 and the carrier 30.

The first ring 61 shown in FIG. 4 has a thickness that is a sum of the thickness of the first portion 611 and the thickness of the second portion 612 for pressing, at the contact region 65, the second ring 62 in the axial direction DA toward the first elastic ring 63. In the sealing member 60 shown, the contact region 65 receives the force of the second ring 62 pressing the first ring 61 toward the case 20 and the force of the first ring 61 pressing the second ring 62 toward the first elastic ring 63. Thus, the contact region 65 receives the forces that are opposite to each other in the axial direction DA. With the sufficient thickness of the first ring 61, the sealing member 60 shown can provide stable sealing between the first and second rings 61 and 62. Therefore, it is possible to inhibit foreign matter from flowing in and inhibit the oil from flowing out.

In the first ring 61 of the sealing member 60 shown in FIGS. 2 and 4, the second portion 612 includes a portion located on the inner side of the first portion 611 in the radial direction DR. The first ring 61 is in contact with the second ring 62 at the second portion 612. In the sealing member 60 shown, the second ring 62, which is in contact with the first ring 61, can be located on the inner side of the first ring 61 in the radial direction DR. This allows the portion of the lubrication region 70 connected to the second ring 62 to be located on the inner side in the radial direction DR, as shown in FIG. 4. Therefore, the enlargement of the lubrication region 70 in the radial direction DR can be inhibited at the portion connected to the second ring 62.

The carrier 30 shown in FIG. 4 is located at least partly inside the case 20 so as to have the gap G between the carrier 30 and the case 20. The gap G is located on the outer side of the contact region 65 in the radial direction DR. The gap G includes a first portion G1 extending in the radial direction DR and a second portion G2 extending in the axial direction DA. As shown in FIG. 4, since the gap G includes portions that extend in directions that are not parallel to each other, foreign matter from the outside of the speed reducer 10 can be inhibited from reaching the contact region 65 of the first ring 61.

In the embodiment described above, the speed reducer 10 includes the case 20, the carrier 30, the main bearings 15, and the sealing member 60. The carrier 30 is located at least partly inside the case 20. The main bearings 15 are located between the case 20 and the carrier 30. The sealing member 60 includes the first ring 61, the second ring 62, and the first elastic ring 63. The first ring 61 has an annular shape and is mounted to one of the case 20 and the carrier 30. The second ring 62 contacts the annular contact region 65 of the first ring 61. The first elastic ring 63 is compressed between the second ring 62 and the other of the case 20 and carrier 30. The sealing member 60 is located at least partly in the same region as the main bearings 15 in the radial direction DR perpendicular to the rotation axis RA of the carrier 30 rotating relative to the case 20.

In this embodiment, the lubrication region 70 of the speed reducer 10, which is located between the case 20 and the carrier 30, can be inhibited from being enlarged outward in the radial direction DR. Since the enlargement of the lubrication region 70 is inhibited, the oil stored in the lubrication region 70 can be reduced in the speed reducer 10 including the sealing member 60. As a result of the reduced oil storage in the lubrication region 70, it is possible to reduce the cost of manufacturing the speed reducer 10 including the sealing member 60 and reduce the weight of the speed reducer 10 thus configured.

While the foregoing has described the embodiment with reference to specific examples, these specific examples do not limit the embodiment. The foregoing embodiment can be implemented in various other specific forms and is susceptible to omission, replacement, modification, and addition of various elements thereof within the purport of the invention.

Figure 5:
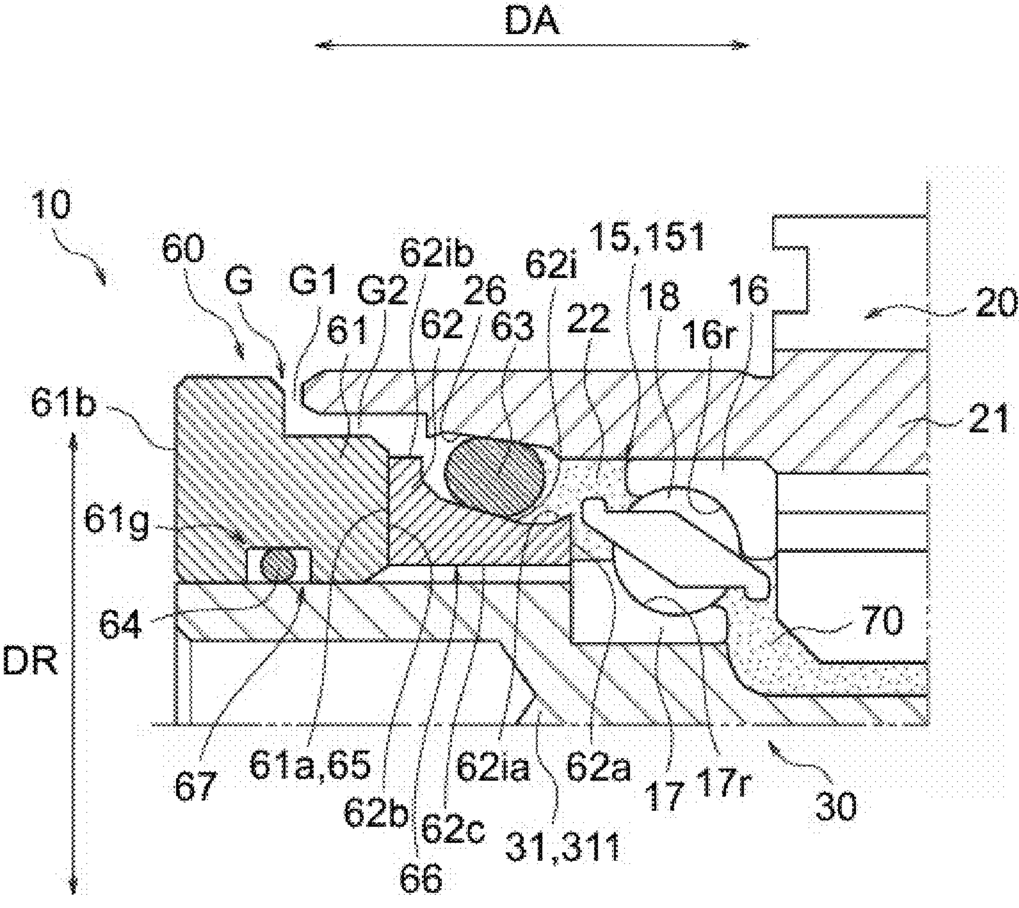
FIG. 5 is a sectional view showing a variation of the sealing member.

In the sealing member 60 described above, the first ring 61 was mounted to the case 20. The first ring 61 was located between the main bearings 15 (first main bearing 151) and the second ring 62 in the axial direction DA. The first elastic ring 63 was compressed between the carrier 30 and the second ring 62. These features are not limitative, and as shown in FIG. 5, the first ring 61 may be mounted to the carrier 30. As shown in FIG. 5, the first elastic ring 63 may be compressed between the case 20 and the second ring 62. The first ring 61 shown is mounted to the base plate portion 311 of the carrier base portion 31. The first ring 61 mounted to the base plate portion 311 is restricted from moving relative to the carrier base portion 31. The sealing member 60 may include a second elastic ring 64 that is compressed between the first ring 61 and the carrier 30 (carrier base portion 31), as shown in FIG. 5.

Figure 6:
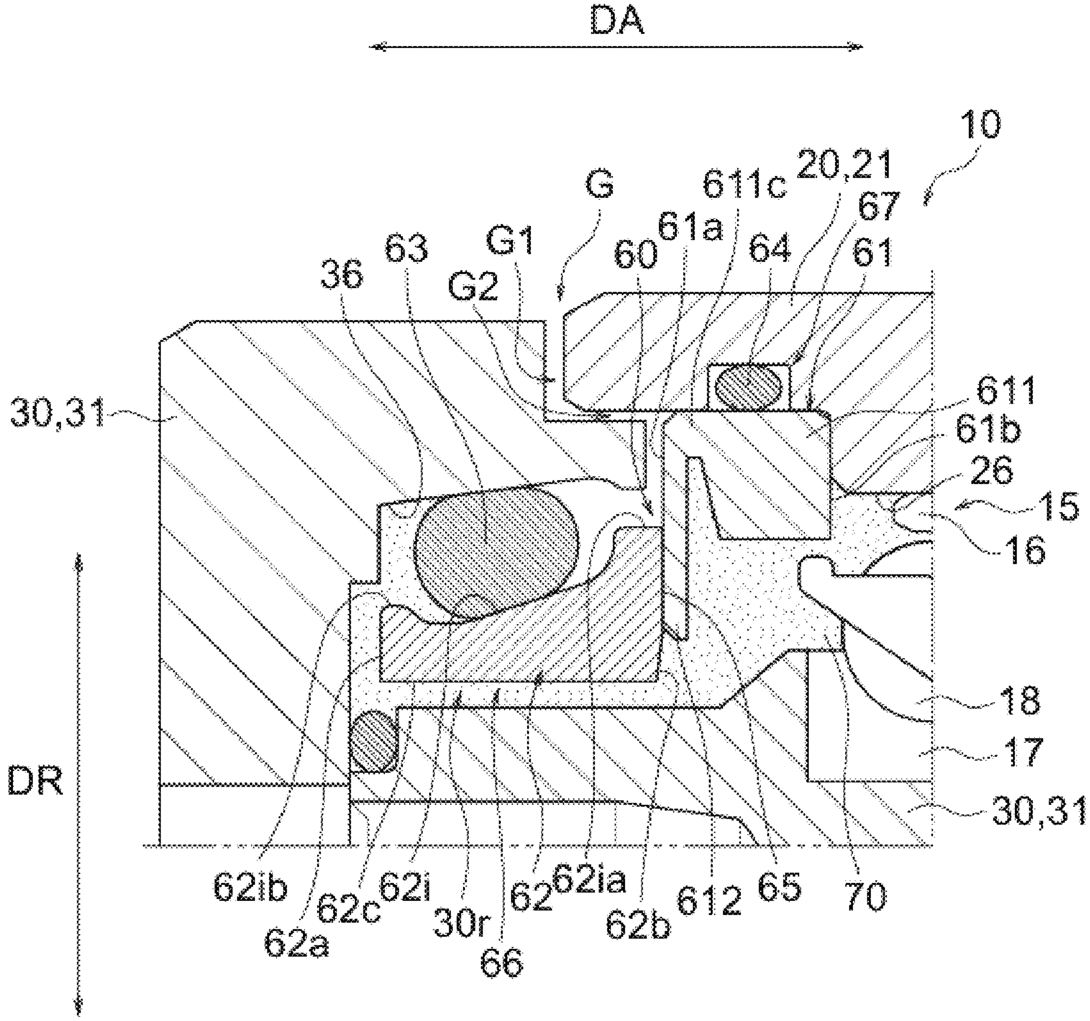
FIG. 6 is a sectional view showing another variation of the sealing member.

The first ring 61 shown in FIG. 4 included a first portion 611 and a second portion 612 connected to the first portion 611 in the axial direction DA. The thickness of the first portion 611, that is, its length in the axial direction DA, was smaller than the thickness of the second portion 612. These features are not limitative, and the second portion 612 may have a smaller thickness than the first portion 611, as shown in FIG. 6. In addition, the length of the first ring 61 in the radial direction DR may be smaller at the connection portion 611*c* of the first portion 611 connecting with the second portion 612 than at any portion of the first portion 611 other than the connection portion 611*c*, as shown in FIG. 6.

Figure 7:
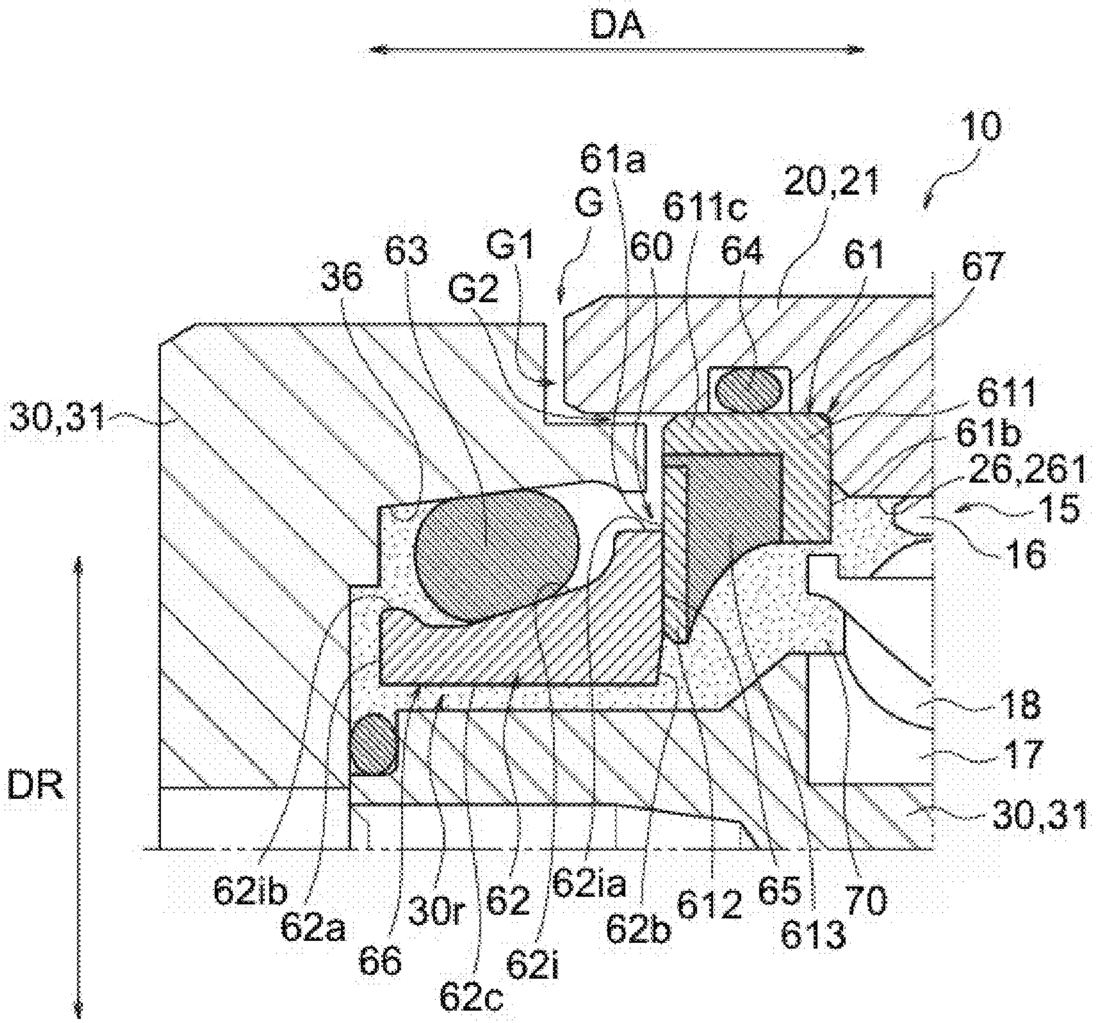
FIG. 7 is a sectional view showing still another variation of the sealing member.

In the first ring 61 shown in FIG. 4, the first portion 611 and the second portion 612 were connected seamlessly. This feature is not limitative, and as shown in FIG. 7, the first ring 61 may include an intermediate portion 613 located between the first portion 611 and the second portion 612. The first portion 611 may be connected to the second portion 612 via the intermediate portion 613.

As shown in FIGS. 6 and 7, the first ring 61 may have a shape that can be deformed by a force applied to the first ring 61 from the second ring 62. In the first ring 61 shown, the length of the first portion 611 in the radial direction DR is smaller at the connection portion 611*c* of the first portion 611 than at any portion of the first portion 611 other than the connection portion 611*c*. The first ring 61 shown is in contact with the second ring 62 at the second portion 612.

When a force is applied in the axial direction DA toward the main bearing 15 from the second ring 62 to the first ring 61 shown in FIGS. 6 and 7, the first ring 61 is bent at the second portion 612 with the connection portion 611*c* serving as the fulcrum. The second portion 612 shown is bent such that its end away from the portion in contact with the case 20 spaced apart in the radial direction DR is closer in the axial direction DA. When the first ring 61 is bent at the second portion 612, the sealing member 60 maintains the contact between the first surface 61*a* of the first ring 61 and the second surface 62*b* of the second ring 62. In the sealing member 60 shown, when the first ring 61 contacts the second ring 62 at the contact region 65, the lubrication region 70 is sealed, and the force applied from the second ring 62 to the first ring 61 is reduced. Since the force applied to the first ring 61 is reduced, the durability of the first ring 61 can be improved.

In the first ring shown in FIG. 7, the intermediate portion 613 is made of a material having a smaller Young's modulus than the materials of the first portion 611 and the second portion 612. When the first ring 61 shown is pressed by the second ring 62 in the axial direction DA toward the main bearings 15, the intermediate portion 613 is compressed and deformed. The deformation of the intermediate portion 613 can reduce the amount of deformation in the first portion 611, forming the second surface 61*b*, and the second portion 612 in the first ring 61 shown in FIG. 7. Thus, the durability of the first ring 61 can be improved.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A speed reducer comprising:
- a case;
- a carrier at least partly located in the case;
- a first main bearing and a second main bearing located between the case and the carrier;
- an external gear located between the first main bearing and the second main bearing in an axial direction parallel to a rotation axis of the case and the carrier relative to each other; and
- a sealing member including:
  - a first ring having an annular shape and mounted to one of the case and the carrier;
  - a second ring in contact with an annular region of the first ring; and
  - an elastic ring compressed between the second ring and another of the case and the carrier,
- wherein the sealing member is at least partly located in a same region as the first main bearing and the second main bearing in a radial direction perpendicular to the rotation axis, and
- wherein the carrier is at least partly located in the case so as to have a gap between the carrier and the case on an outer side of the annular region in the radial direction, and
- wherein the gap includes a portion extending in the radial direction and a portion extending in the axial direction parallel to the rotation axis.

2. The speed reducer of claim 1, wherein the first ring has a thickness for pressing the second ring toward the elastic ring at the annular region.

3. The speed reducer of claim 1, wherein the annular region is located in the case.

4. The speed reducer of claim 1, wherein the first ring is located between the second ring and the first main bearing in an axial direction parallel to the rotation axis, and
- wherein the first ring includes a portion that is at least partly located in a same region as the first main bearing in the axial direction.

5. The speed reducer of claim 1, wherein the first ring includes a first portion and a second portion connected to the first portion in an axial direction parallel to the rotation axis,
- wherein the first portion is located in a same region as the first main bearing in the axial direction,
- wherein the second portion includes a portion located on an inner side of the first portion in the radial direction, and
- wherein the first ring is in contact with the second ring at the second portion.

6. The speed reducer of claim 5, wherein a length of the first portion in the radial direction is smaller at a connection portion with the second portion.

7. The speed reducer of claim 6, wherein the first ring includes an intermediate portion, the intermediate portion being located between the first portion and the second portion and made of a material having a smaller Young's modulus than materials of the first portion and the second portion.

8. A speed reducer comprising:
- a case;
- a carrier at least partly located in the case;
- a main bearing located between the case and the carrier; and
- a sealing member including:
  - a first ring having an annular shape and mounted to one of the case and the carrier;
  - a second ring in contact with an annular region of the first ring; and
  - an elastic ring compressed between the second ring and another of the case and the carrier,
- wherein the sealing member is at least partly located in a same region as the main bearing in a radial direction perpendicular to a rotation axis of the carrier rotating relative to the case,
- wherein the carrier is at least partly located in the case so as to have a gap between the carrier and the case on an outer side of the annular region in the radial direction, and
- wherein the gap includes a portion extending in the radial direction and a portion extending in an axial direction parallel to the rotation axis.

9. An industrial machine comprising:
- a drive device including a speed reducer,
- wherein the speed reducer includes:
  - a case;
  - a carrier at least partly located in the case;
  - a first main bearing and a second main bearing located between the case and the carrier;
  - an external gear located between the first main bearing and the second main bearing in an axial direction parallel to a rotation axis of the case and the carrier relative to each other; and
  - a sealing member that provides sealing between the case and the carrier, wherein the sealing member includes:
  - a first ring having an annular shape and mounted to one of the case and the carrier;
  - a second ring in contact with an annular region of the first ring; and
  - an elastic ring compressed between the second ring and another of the case and the carrier, and
- wherein the sealing member is at least partly located in a same region as the first main bearing and the second main bearing in a radial direction perpendicular to the rotation axis, and
- wherein the carrier is at least partly located in the case so as to have a gap between the carrier and the case on an outer side of the annular region in the radial direction, and wherein the gap includes a portion extending in the radial direction and a portion extending in the axial direction parallel to the rotation axis.

* * * * *